(12) United States Patent
Cortada Acosta

(10) Patent No.: US 9,923,422 B2
(45) Date of Patent: Mar. 20, 2018

(54) ROTOR ASSEMBLY

(71) Applicant: Alstom Renovables España, S.L., Barcelona (ES)

(72) Inventor: Pere Cortada Acosta, Sant Cugat Del Vallès (ES)

(73) Assignee: GE Renewable Technologies Wind B.V., Breda (NL)

( * ) Notice: Subject to any disclaimer, the term of this patent is extended or adjusted under 35 U.S.C. 154(b) by 0 days.

(21) Appl. No.: 14/362,110

(22) PCT Filed: Jan. 25, 2013

(86) PCT No.: PCT/EP2013/051430
§ 371 (c)(1),
(2) Date: May 30, 2014

(87) PCT Pub. No.: WO2013/110752
PCT Pub. Date: Aug. 1, 2013

(65) Prior Publication Data
US 2014/0306572 A1    Oct. 16, 2014

Related U.S. Application Data

(60) Provisional application No. 61/616,105, filed on Mar. 27, 2012.

(30) Foreign Application Priority Data

Jan. 27, 2012 (EP) .................................. 12382029

(51) Int. Cl.
*H02K 1/27* (2006.01)
*H02K 1/30* (2006.01)
*H02K 7/18* (2006.01)

(52) U.S. Cl.
CPC ................. *H02K 1/27* (2013.01); *H02K 1/30* (2013.01); *H02K 7/1838* (2013.01); *Y02E 10/725* (2013.01)

(58) Field of Classification Search
CPC ........... H02K 1/27; H02K 1/30; H02K 7/1838
USPC ....................................... 310/216.01–216.84
See application file for complete search history.

(56) References Cited

U.S. PATENT DOCUMENTS

| 4,291,235 A | 9/1981 | Bergey |
| 7,679,260 B2 * | 3/2010 | Yamamoto ........... H02K 1/2793 310/156.12 |
| 9,030,036 B2 | 5/2015 | Stiesdal |
| 9,197,116 B2 | 11/2015 | Junge |

(Continued)

FOREIGN PATENT DOCUMENTS

| EP | 2063115 | 5/2009 |
| WO | WO 2011/031165 | 3/2011 |

OTHER PUBLICATIONS

International Search Report and Written Opinion for PCT/EP2013/051430, dated Feb. 20, 2014, 8 pgs.

*Primary Examiner* — Hanh Nguyen
*Assistant Examiner* — Leda Pham
(74) *Attorney, Agent, or Firm* — Dority & Manning, P.A.

(57) ABSTRACT

A rotor assembly comprises a number of rotor segments forming a rotor structure and a central structure connected to the rotor structure and at least partially arranged between at least two of the rotor segments, for example surrounded by the rotor structure. A wind turbine generator comprising a stator assembly and said rotor assembly and a wind turbine comprising such a generator are also provided.

10 Claims, 3 Drawing Sheets

(56) References Cited

U.S. PATENT DOCUMENTS

| 2008/0129136 A1* | 6/2008 | Abe | H02K 21/042 |
| | | | 310/156.35 |
| 2008/0265585 A1* | 10/2008 | Torres Martinez | F03D 1/025 |
| | | | 290/55 |
| 2011/0266909 A1* | 11/2011 | Lokhandwalla | H02K 1/2766 |
| | | | 310/156.12 |

* cited by examiner

ROTOR ASSEMBLY

This application claims the benefit of European Patent Application EP12382029 filed Jan. 27, 2012 and U.S. Provisional Patent Application Ser. No. 61/616,105 filed Mar. 27, 2012.

BACKGROUND

A rotor assembly is disclosed herein. A wind turbine generator comprising said rotor assembly is also disclosed herein. A wind turbine comprising such generator is also disclosed herein.

Direct drive wind turbines are known in which the gearbox, which is typically arranged between a main shaft and a generator of the wind turbine, is substituted by a multipolar generator. These types of gearless wind turbines do not make use of a gearbox as the wind rotor is connected directly to the rotor of the wind turbine. For this reason, the multipolar generator is also referred to as a directly driven generator. Directly driven generators may be for example synchronous generators with winded rotor or with permanent magnets arranged on the rotor.

One of the main disadvantages of the directly driven generators is that their physical dimensions are relatively large. This makes transport and logistics of such generators complex. In addition, the overall weight of such generators involves additional difficulties, for example in assembling, maintenance and/or repair operations.

To at least partially overcome said disadvantages, it is known in the art to make such generators from segments. The use of modular parts for forming, for example, allows manufacturing, transport and handling operations to be reduced.

Examples of such prior art solutions to the above problem are disclosed in EP2063115 and WO2011031165. These documents refer to directly driven generators for a wind turbine in which the stator and the rotor are both formed of segments in order to facilitate transport operations of the generator.

Although modular generators may be advantageous for transport and maintenance or repair operations, the above prior art solutions have the disadvantage that in order to ensure a sufficient stiffness of the generator to withstand operation conditions the generator structure should be oversized. This undesirably leads to higher costs, which in addition does not lead to a better performance.

SUMMARY

A rotor assembly for a generator in a wind turbine. The rotor assembly comprises a number of rotor segments forming a rotor structure, wherein the rotor assembly further includes a central structure connected to the rotor structure and at least partially arranged between at least two of the rotor segments. A wind turbine generator comprising said rotor assembly is also disclosed herein. In addition, a wind turbine comprising said generator is also disclosed herein. Advantageous examples are disclosed herein.

The present rotor assembly is suitable for large size generators such as those of the direct drive type. The present rotor assembly is particularly suitable for synchronous generators with winded rotor or with permanent magnets arranged on the rotor. Other applications are however not ruled out.

The present rotor assembly comprises a number of rotor segments, for example four or six, each having a specific geometry. Of course a number of rotor segments other than the above mentioned may be provided as necessary.

The rotor segments can be made of a suitable size to allow transportation by means of standard transportation means, such as trucks or trailers with a maximum width of 4 m. The rotor segments may be adapted to be mounted adjacent to each other, such as in a radial relationship, forming a circular arrangement. The rotor segments form a rotor structure having a modular nature. The rotor segments may be equal, similar or even different from each other.

The rotor assembly further comprises a rotor frame. The rotor frame may comprise frame segments as well.

The present rotor assembly advantageously includes a central structure. This central structure may comprise a reinforcing element that may be formed of a single piece. However, the provision of more than one central structure, each made of a number of reinforcing elements could also be possible.

The central structure of the present rotor assembly is connected by any suitable means to the rotor structure. The central structure is at least partially arranged between at least two of the rotor segments. Preferably, the central structure of the rotor assembly is at least partially surrounded by the rotor structure and connected thereto as stated above.

A connecting device may be provided for removably connecting the central structure to the rotor structure. The connecting device may be any standard mechanical connecting device which at least may comprise, for example, screws and nuts. Other known mechanical connecting devices may be alternatively or additionally used such as welding, if required.

In this respect, the central structure of the rotor assembly includes at least one connecting area where the central structure is connected, through said connecting device, to the rotor structure. A number of connecting areas in correspondence with the rotor segments may be provided. The connecting areas may be defined by plates associated both with the rotor segments and the rotor frame, for example. The plates of the connecting device are attached to each other through, for example, screws and nuts.

With the above defined rotor assembly both structural features and logistics can be efficiently improved at the same time.

The stiffening provided with the central structure is advantageous when the generator is in use, i.e. during energy generation, as it has been found that the central portion of the rotor assembly is subjected to large loads when in use. Since the whole rotor assembly is reinforced, a better structural behaviour can be achieved such that the rotor assembly is capable of withstanding the required loads. In addition, stiffening provided with the central structure is advantageous during manufacturing, handling and installation processes, as well as during transportation as likewise the central portion of the rotor assembly is subjected to large loads when handled, transported or installed. Stiffening provided with the central structure is also advantageous in keeping the size of the air gap inside the rotor structure.

A further advantage of the present rotor assembly is the improvement of logistics. The rotor segments can be advantageously transported, installed, repaired and dismantled individually and independently of each other. This results in that the use of large cranes is no longer necessary and the number of operators is reduced. As stated above, since unitary size and weigh are significantly reduced, standard transportation means can be advantageously used. No specific and expensive transportation means are therefore required.

With the above configuration, the rotor assembly can be advantageously made from different materials and/or by different manufacturers. The possibility of assembling and disassembling the rotor segments of the rotor structure allows the bearings to be easily accessed for assembling and disassembling them in repair and/or maintenance operations of the wind turbine generator.

A wind turbine generator comprising a stator assembly and the rotor assembly as defined above and a wind turbine comprising such a generator have enough stiffness to withstand operation during energy generation and also during handling and installation processes, as well as during transportation, as stated above. The wind turbine generator defined herein is suitable both for onshore and offshore applications.

Additional objects, advantages and features of examples of the present rotor assembly, wind turbine generator and wind turbine will become apparent to those skilled in the art upon examination of the description, or may be learned by practice thereof.

BRIEF DESCRIPTION OF THE DRAWINGS

Particular examples of the present rotor assembly, wind turbine generator and wind turbine will be described in the following by way of non-limiting examples, with reference to the appended drawings.

In the drawings.

DETAILED DESCRIPTION OF EXAMPLES

Figure 1:
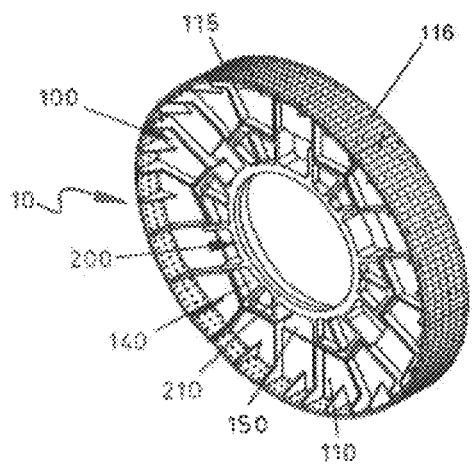
FIG. 1 is a general perspective view of one example of the present rotor assembly.

The figures show different examples of a rotor assembly suitable for a direct type synchronous wind turbine generator. The rotor assembly has been indicated by reference numeral 10 as whole throughout the drawings. Like reference numerals refer to like parts throughout the various views.

Figure 7:
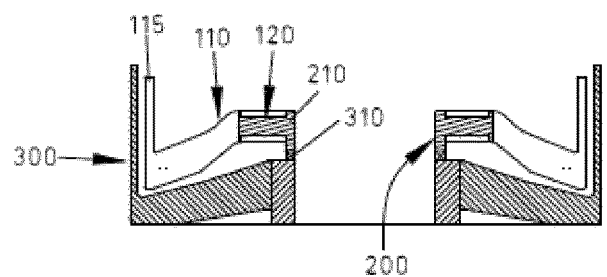
FIG. 7 is a cross-sectional view of the present rotor assembly mounted on a stator assembly taken along line BB' in FIG. 6.
Figure 8:
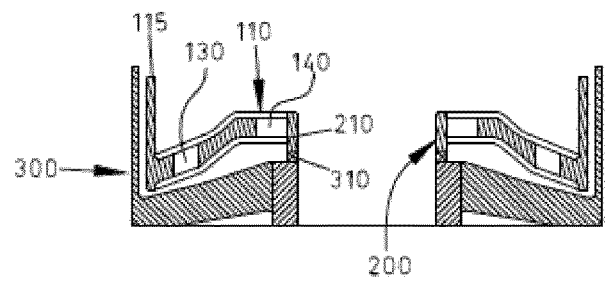
FIG. 8 is a cross-sectional view of the present rotor assembly mounted on a stator assembly taken along line AA' in FIG. 6.

The rotor assembly 10 may be rotated relative to a stator assembly 300 through suitable bearings 310, as shown in FIGS. 7 and 8.

The examples of the rotor assembly 100 shown as non-limiting examples in FIGS. 1-5 comprise six rotor segments 110. Other examples of the rotor assembly 10 having a different number of rotor segments 110 are possible according to the requirements. For example, the example of the rotor assembly 10 depicted in FIG. 6 comprises four rotor segments 110.

The rotor segments 110 form a modular rotor structure 100 as shown in the FIGS. 1-6 of the drawings. Division of rotor structure 100 of the rotor assembly 10 into rotor segments 110 facilitates transportation since the unitary size of parts to be transported is advantageously reduced.

The rotor segments 110 are shaped pieces adapted to be mounted adjacent to each other as shown in the FIGS. 1-6 of the drawings. Although the rotor segments 110 are shown as being substantially equal to each other, they may be alternatively similar or different to each other as necessary.

The modular rotor structure 100, formed by the rotor segments 110, carries a rotor frame 115. The rotor frame 115 is formed of frame segments as well. The rotor frame 115 is intended to receive a plurality of rotor magnets (not shown in detail in the figures but indicated as magnets 116 in FIG. 1).

The rotor assembly 10 in the example shown further includes a central structure 200. The central structure 200 is made of a reinforced single piece that is arranged between the rotor segments 110 in a central position in the rotor assembly 10 as shown in the figures. Different configurations of the central structure 200 are possible, as those shown in FIGS. 1-6.

As shown in FIGS. 7 and 8, bearings 310 are provided in the central structure 200. The central structure 200 is designed both for reinforcing and handling purposes.

The central structure 200 of the rotor assembly 10 may be adapted to be attached both to the rotor segments 110 and to a portion of the rotor frame 115. In other examples the central structure 200 may be attached to the rotor segments 110. There may be the same portions of the rotor frame 115 as rotor segments 110.

The rotor frame 115 may be a cylindrical piece that may be formed in turn by frame segments as stated above. This cylindrical piece may have a substantially T-shaped cross-section defining two substantially perpendicular surfaces.

The attachment between the rotor frame 115 and the rotor segments 110 and the attachment between the rotor frame 115 and the central structure 200 is by welding. Therefore, the rotor frame 115 may be part of the rotor segments 110. The attachment between the rotor segments 110 and the attachment between the rotor segments 110 and the central structure 200 is carried out by screws.

Figure 6:
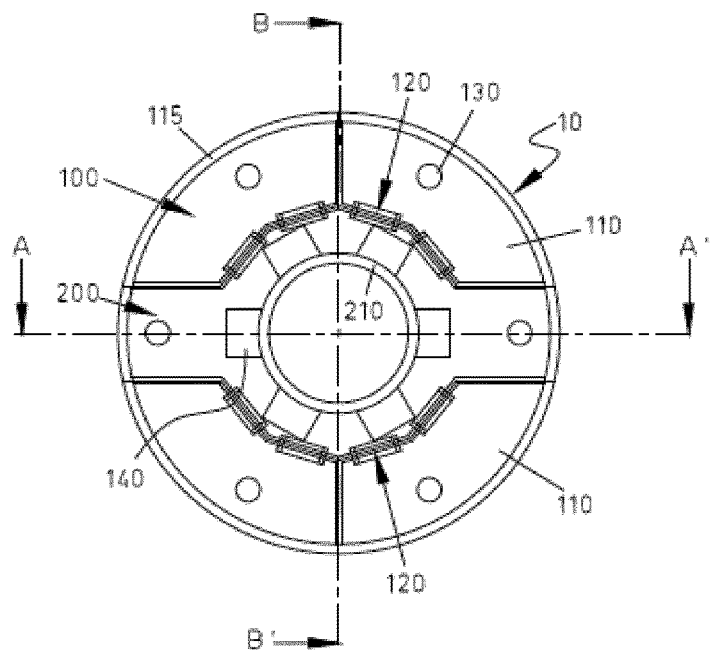

For removably connecting the central structure 200 to the rotor segments 110, a connecting device 120 is provided. In the example diagrammatically shown in FIG. 6, the connecting device 120 comprises pairs of plates between which a portion of the rotor segments 110 and a corresponding portion of the central structure 200 is arranged. The plates are attached to each other with suitable screws and nuts. In the example shown in FIG. 6, for example, the rotor assembly 10 has two connecting devices 120 for each rotor segment 110. A total of eight connecting devices 120 are thus provided with the rotor structure 100 that is formed of four rotor segments 110 as shown in FIG. 6.

The rotor segments 110 in the examples shown in FIGS. 3-6 are provided with locking bores 130. The locking bores 130 serve the purpose of receiving corresponding locking pins (not shown) fixedly attached to the stator assembly 300 for locking the rotor assembly 10 in position when necessary. When the locking pins are received into the locking bores 130, the rotor assembly is prevented from being rotated relative to the stator assembly 300.

Figure 2:
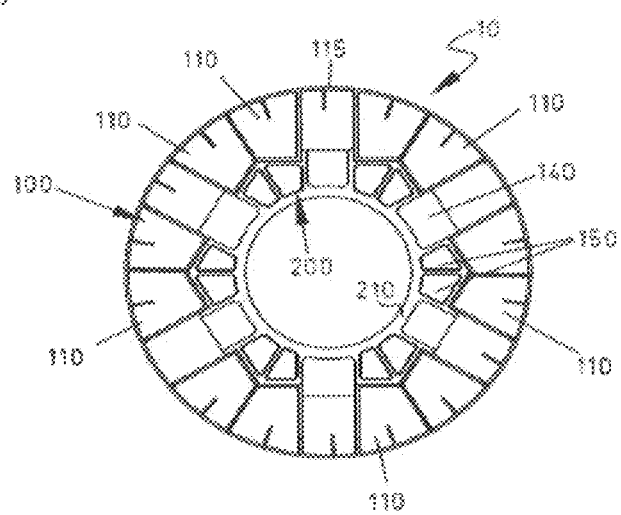
FIG. 2 is an elevational view of the example of the rotor assembly shown in FIG. 1.
Figure 3:
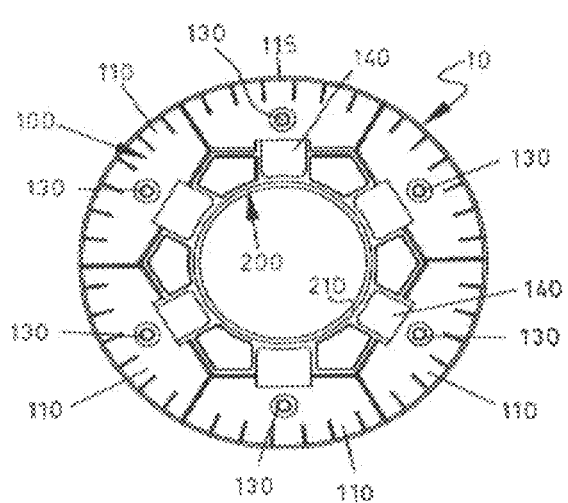
FIGS. 3-6 are elevational views of alternative examples of the present rotor assembly.
Figure 4:
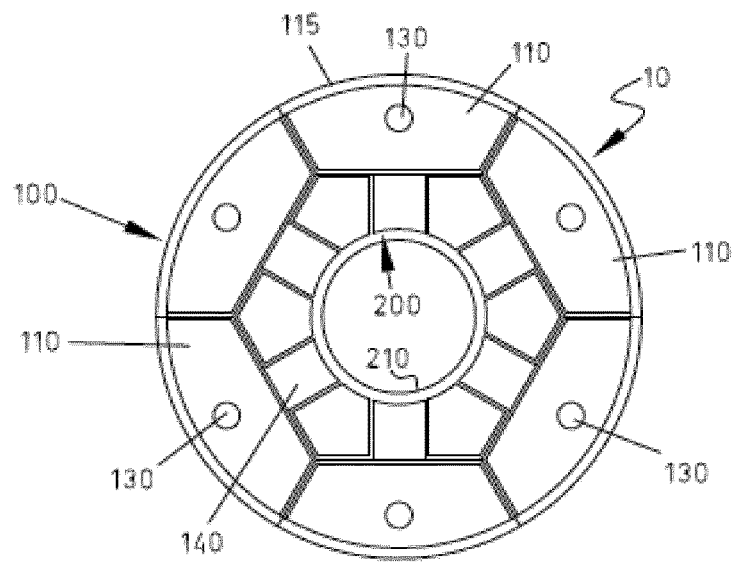
Figure 5:
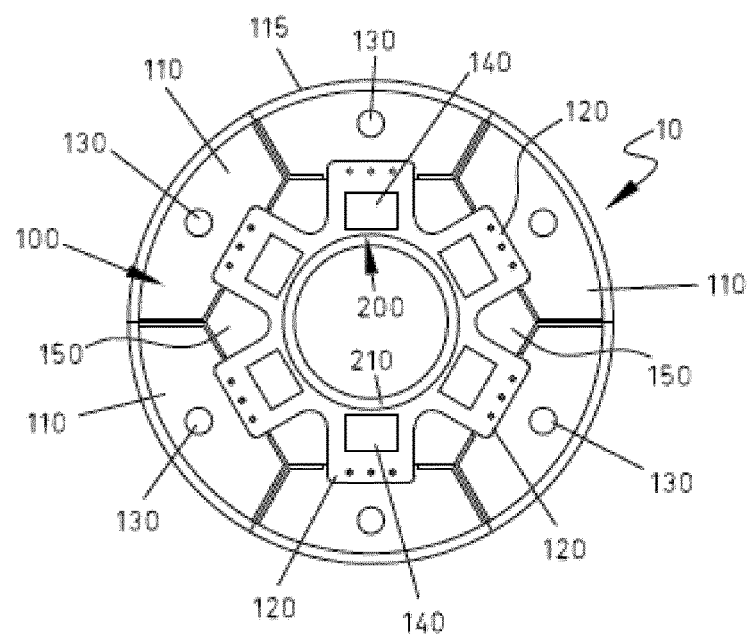

The central structure 200 in the examples of figures are provided with rectangular holes 140. The rectangular holes 140 are intended for connection to the hub of the wind turbine by means of flexible couplings. The central structure 200 in the examples of figures may be also provided with access holes 150 sized for accessing the rotor assembly 10 through the stator assembly 300, as shown in FIGS. 1, 2 and 5.

As stated above, the central structure 200 is made of a single piece. This single piece defines a central cylindrical opening 210 as shown in the figures of the drawings.

When the rotor assembly 10 is still not assembled to the stator assembly 300 as shown in FIGS. 1-6, the rotor assembly 10 can be easily handled through the central structure 200. This is advantageous since if the rotor assembly 10 is otherwise caught by its end portions, local deformations in the outer portion of the rotor where the magnets are provided may occur. Since the air gap in the rotor assembly 10 is small, such as of the order of 7 mm, any local deformations can adversely affect the generator's performance.

Although only a number of particular examples of the present rotor assembly, generator having such rotor assembly and wind turbine having such generator have been disclosed herein, it will be understood by those skilled in the art that other alternative examples and/or uses and obvious modifications and equivalents thereof are possible.

The claims cover all possible combinations of the particular examples described, so the scope should not be limited by particular examples, but should be determined only by a fair reading of the claims that follow.

The invention claimed is:

1. A rotor assembly for a wind turbine generator, the rotor assembly comprising:
   a number of rotor segments forming a modular rotor structure carrying a rotor frame, the rotor frame separate from the rotor segments, the rotor frame having an outer periphery and a plurality of rotor magnets carried on the outer periphery,
   a single-piece central structure separate from the rotor frame connected to the rotor structure,
   wherein the central structure comprises opposite radially extending portions that extend between adjacent rotor segments to an inner circumferential portion of the rotor frame and define a reinforcing element attached both to the rotor segments and to a portion of the rotor frame such that the rotor frame is connected to and circumferentially surrounds the rotor segments and the radially extending portions of the central structure.

2. The rotor assembly as claimed in claim 1, wherein the central structure is at least partially surrounded by and connected to the rotor structure.

3. The rotor assembly as claimed in claim 1, wherein the rotor assembly further comprises a connecting device for removably connecting the central structure to the rotor structure.

4. The rotor assembly as claimed in claim 1, wherein the central structure includes at least one connecting area where the central structure is connected to the rotor structure.

5. The rotor assembly as claimed in claim 1, wherein the central structure includes a number of connecting areas where a connecting device is provided for removably connecting the central structure to the rotor structure.

6. The rotor assembly as claimed in claim 1, wherein the central structure includes at least one connecting area where the central structure is connected to the rotor structure by welding, or plates attached to each other with screws.

7. A wind turbine generator, comprising:
   a stator assembly and a rotor assembly, the rotor assembly comprising a number of rotor segments forming a modular rotor structure,
   a rotor frame carried by the rotor structure, the rotor frame separate from the rotor segments and having an outer periphery and a plurality of rotor magnets carried on the outer periphery, and
   a single-piece central structure separate from the rotor frame connected to the rotor structure,
   wherein the central structure comprises opposite radially extending portions that extend between adjacent rotor segments to an inner circumferential portion of the rotor frame and define a reinforcing element attached both to the rotor segments and to a portion of the rotor frame such that the rotor frame is connected to and circumferentially surrounds the rotor segments and the radially extending portions of the central structure.

8. The rotor assembly as claimed in claim 7, wherein the central structure includes at least one connecting area where the central structure is connected to the rotor structure by welding, or plates attached to each other with screws.

9. A wind turbine, comprising:
   a generator having a stator assembly and a rotor assembly, the rotor assembly comprising a number of rotor segments forming a modular rotor structure,
   a rotor frame carried by the rotor structure, the rotor frame separate from the rotor segments and having an outer periphery and a plurality of rotor magnets carried on the outer periphery, and
   a single-piece central structure separate from the rotor frame connected to the rotor structure,
   wherein the central structure comprises opposite radially extending portions that extend between adjacent rotor segments to an inner circumferential portion of the rotor frame and define a reinforcing element attached both to the rotor segments and to a portion of the rotor frame such that the rotor frame is connected to and circumferentially surrounds the rotor segments and the radially extending portions of the central structure.

10. The rotor assembly as claimed in claim 9, wherein the central structure includes at least one connecting area where the central structure is connected to the rotor structure by welding, or plates attached to each other with screws.

* * * * *